United States Patent [19]
Hildebrand

[11] Patent Number: 5,322,115
[45] Date of Patent: Jun. 21, 1994

[54] INSTALLATION FOR ENERGY EXCHANGE BETWEEN THE GROUND AND AN ENERGY EXCHANGER

[76] Inventor: Hans Hildebrand, Eichrüti 14, CH-6330 Cham, Switzerland

[21] Appl. No.: 720,500

[22] PCT Filed: Jul. 4, 1989

[86] PCT No.: PCT/CH89/00127

§ 371 Date: Mar. 8, 1990

§ 102(e) Date: Mar. 8, 1990

[87] PCT Pub. No.: WO90/00707

PCT Pub. Date: Jan. 25, 1990

[30] Foreign Application Priority Data

Jul. 8, 1988 [CH] Switzerland .................. 2607/88

[51] Int. Cl.⁵ ........................................... F28D 21/00
[52] U.S. Cl. ........................................ 165/45; 62/260
[58] Field of Search .................. 165/45, 142; 62/260

[56] References Cited

U.S. PATENT DOCUMENTS

| | | | |
|---|---|---|---|
| 3,679,264 | 7/1972 | Van Huisen | 165/45 X |
| 3,805,885 | 4/1974 | Van Huisen | 165/45 |
| 4,010,731 | 3/1977 | Harrison | 165/45 |
| 4,019,577 | 4/1977 | Fitch et al. | 165/45 X |
| 4,060,988 | 12/1977 | Arnold | 165/45 X |
| 4,392,531 | 7/1983 | Ippolito | 165/45 X |
| 4,452,303 | 6/1984 | Bontje et al. | 165/142 |

FOREIGN PATENT DOCUMENTS

| | | |
|---|---|---|
| 45993 | 2/1982 | European Pat. Off. . |
| 3149636 | 7/1983 | Fed. Rep. of Germany . |
| 2444903 | 7/1980 | France . |
| 658513 | 11/1986 | Switzerland . |
| 2058334 | 4/1981 | United Kingdom . |

Primary Examiner—John Rivell
Assistant Examiner—L. R. Leo
Attorney, Agent, or Firm—Anderson, Kill, Olick & Oshinsky

[57] ABSTRACT

A heat exchanger is connected via an insulated flow pipe (26) to a pump (28) arranged in a borehole. The flow pipe and the pump are surrounded in the borehole by a protective tube (34) open at the bottom adjacent to a return region (38) which extends radially outward to the wall of the borehole. The return region communicates with the interior of the protective tube. A return line (42) from the energy exchanger contains at least one return pipe (40) which extends approximately to the bottom of the borehole and is subdivided along its length by a plurality of transverse plugs (44). At the transverse plugs, the return water flows through passages arranged on either side of the transverse plugs and penetrates the porous filling (48) surrounding the return pipe. After the transverse plugs, the return water flows out of the porous filling and back through the passages into the return pipe. This results in reliable guiding of the return water and optimal heat uptake by the water from the return region and from the wall of the drilled hole.

7 Claims, 1 Drawing Sheet

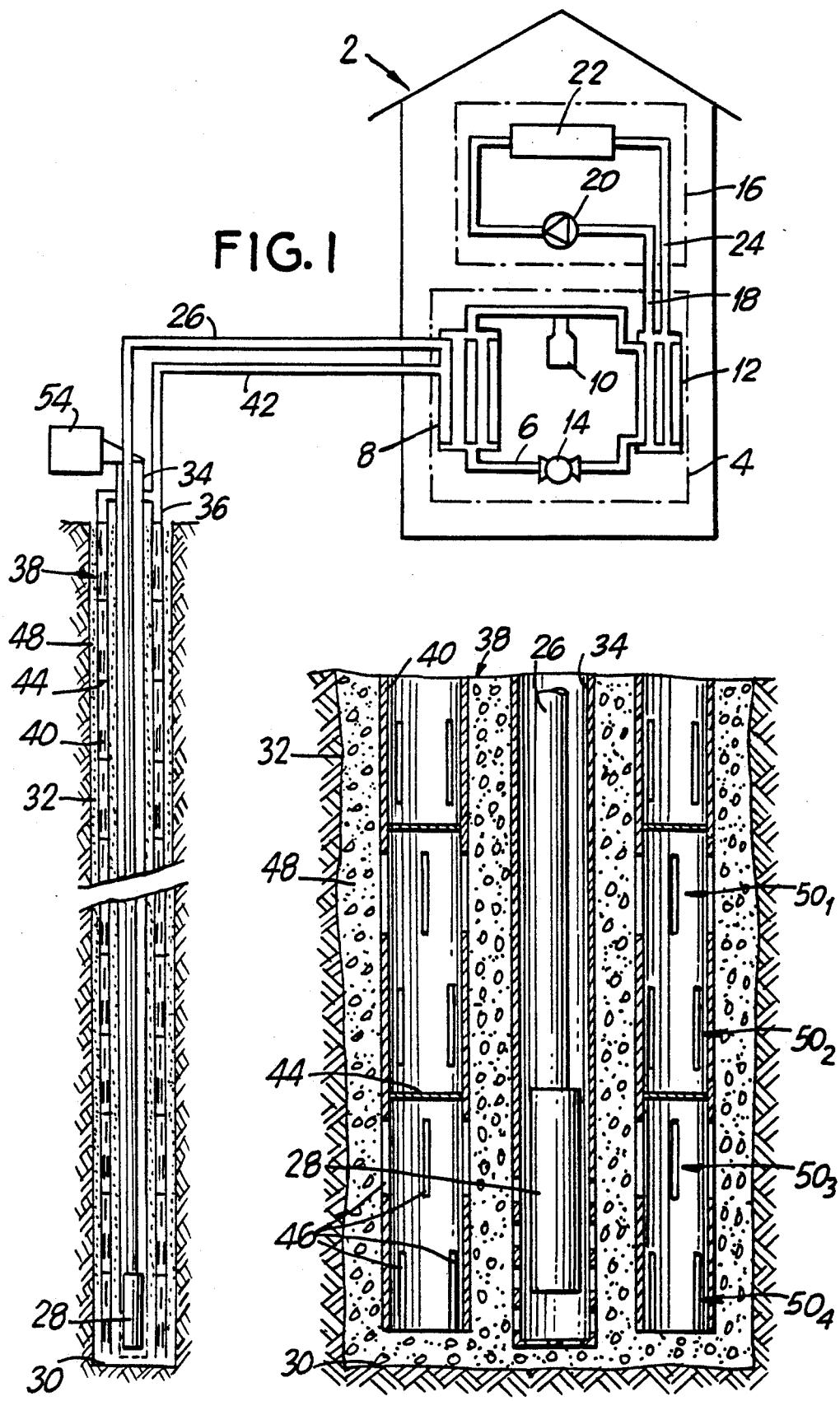

INSTALLATION FOR ENERGY EXCHANGE BETWEEN THE GROUND AND AN ENERGY EXCHANGER

The invention relates to an installation for utilizing the earth's heat in accordance with the preamble of claim 1.

Installations of the above-described type are known, for example, from Swiss Patent 650,069. In the installation described in this patent, the return line leads into the upper portion of the borehole underneath the earth's surface. The water then flows through the porous filling to the bottom of the borehole, the water is heated as a result and is again conducted to the heat pump through the flow lines by means of the pump. This has the disadvantage that the return water is conducted in an uncontrolled manner in the return region, so that, on the one hand, short circuit loads may occur which make a sufficient heating of the return water difficult On the other hand, there is the danger that the porous filling is clogged, so that the resistance to flow is increased and there is the danger that the return water flows off into the ground. It is then necessary to pump water by means of the pump from the surrounding ground which, however, poses problems because of the resistance to flow in the ground Moreover, silt material is picked up from the ground which, in turn, results in clogging of the intake region at the bottom of the borehole and causes the pump to become ineffective.

It is the object of the invention to construct an installation of the above-described type in such a way that the described disadvantages are avoided.

The above object is met in accordance with the invention by the characterizing features of claim 1.

The arrangement of the return pipe with several transverse plugs distributed over the length of the return pipe and the passages arranged on both sides of the transverse plugs ensure a defined return flow of the return water. The transverse plugs force the return water radially outwardly through the passages into the porous filling and, thus, cause the water to come into contact with the wall of the borehole and to be heated. After passing the transverse plug, the return water can again flow through the passages into the return pipe and can flow to the next transverse plug where it is again forced to flow out. This guidance of the return water defines the return flow to the bottom of the borehole, on the one hand, and ensures, on the other hand, that the return water is always in contact with the filling and the borehole wall and, thus, can be heated. However, the distances are so short that the return water can again collect in the next section of the return pipe. The fact that the return water flows out radially also ensures that the flow paths are kept free along the porous filling. The defined guidance of the return water further prevents water losses to the surrounding area. This results in an excellent guidance of the return water to the bottom of the borehole and to the pump, so that an optimum heating of the return water and a sufficient amount of return water through the pump are ensured. The result is an installation having a high efficiency and a low susceptibility to trouble.

Advantageous developments of the installation are described in claims 2 to 7.

A development of the installation in accordance with claim 2 is particularly advantageous because the longitudinal slots make it possible to distribute the water guidance over a greater area and the small width still makes possible a strong jet which is capable of penetrating the porous filling up to the borehole wall and simultaneously flushing out any silt material from the porous filling. It is a further advantage if the installation is constructed in accordance with claim 3, so that a uniform distribution of the water guidance over the entire length of the return pipe is ensured. By offsetting the passages of adjacent rows, flushing through the porous filling and flushing free the porous fillings are reinforced.

Various materials may serve as filling, such as, slag, special components and the like. However, the feature according to claim 4 is preferred.

It is essentially conceivable to arrange only one return pipe in the return region. However, substantially better results can be achieved by a construction according to claim 5 because it is then possible to uniformly reach and utilize all portions of the borehole.

The development of the installation according to claim 6 is particularly advantageous for preventing corrosion. The pipes of plastic material have a long service life and prevent corrosion residues from depositing. As a result, the installation has a long service life and a low susceptibility to trouble and, moreover, the ground water surrounding the boreholes is not negatively influenced.

In particular, the installation also makes possible the development of claim 7, whereby any clogging can be eliminated by means of return flushing water.

Embodiments of the subject matter of the invention are described in more detail below with the aid of the drawings, wherein FIG. 1 is a schematic vertical sectional view of an installation, and FIG. 2 shows the bottom portion of the borehole on a larger scale.

FIG. 1 shows an installation for utilizing the earth's heat, for example, for at least partially heating a house 2. For this purpose, the house has an energy exchanger which is constructed as a heat pump 4 which includes in a medium circulation system 6 an evaporator 8, a compressor 10, a condenser 12 and a throttle valve 14. Such heat pumps 4 are known.

Connected to the condenser 12 is in the known manner a heating unit 16 with a heat flow line 18, a circulation pump 20 and a heat user 22. A heat return line 24 closes the connection from the heat user 22 to the condenser 12.

A flow pipe 26 is connected to the evaporator 8. The flow line 26 is connected to a pump 28 which preferably is arranged at the bottom 30 of a borehole 32. The flow line 26 and the pump 28 are surrounded by a protective tube 34. A return region 38 extending radially outwardly to the borehole wall 36 is provided adjacent the protective tube 34. Several return pipes 40 are arranged in this return region 38. The return pipes 40 are arranged distributed over the circumference and are combined in a common return line 42 which is connected to the evaporator 8.

As can be seen in FIG. 2, each return pipe 40 extends almost to the bottom 30 of the borehole 32 and includes several transverse plugs 44 which are distributed over the length of the return pipe 40. Passages 46 are arranged on both sides of the transverse plugs 44. The passages initially facilitate a discharge of the return water into the porous filling 48 which surrounds the return pipe 40 and fills out the return region 38. The passages are preferably longitudinal slots which may have a width of 1 mm and a length of 150 mm. The return pipe has several rows $50_{1\ to\ 4}$ of the passages 46. The rows are distributed over the length of the return pipe and, for example, four passages per row can be distributed over the circumference of the return pipe 40. The passages 46 of the adjacent rows are preferably arranged offset relative to each other in circumferential direction.

The porous filling 48 filling out the return region 38 around the return pipe 40 advantageously is gravel having a granular size of 0.8 to 8 mm. In the region of the bottom 30 of the borehole 32, the return region 38 is in connection with the interior of the protective tube 34 through passages 52 in the protective tube 34. A scavenging pump 54 is connected to the upper end of the protective tube 34. The scavenging pump 54 serves to introduce return flushing water into the protective tube 34 and through the passages 52 into the return region 38 in order to eliminate any silt accumulation in the porous filling 48.

A specific embodiment of the installation may have the following dimensions:

| | |
|---|---|
| Diameter of borehole: | 500 to 1000 mm |
| Depth of borehole: | 100 to 2000 m and deeper |
| Diameter of flow pipe: | 50 to 90 mm |
| Diameter of return pipe: | 40 to 50 mm |
| Diameter of protective tube: | 120 to 160 mm |
| Temperature of return water: | greater than 6° C. |
| Quantity of circulating water: | 1.5 to 10 m³/h |
| Power: | 30 KW at 250 m depth |
| | 50 KW at 350 m depth |

The insulating flow line and the return pipe are advantageously of plastic material, preferably polyvinylchloride. Depending on the geological conditions, the borehole itself may be lined at least over portions thereof by means of a steel pipe.

The term energy exchanger used herein is to be understood in its most general sense and may include a direct user, such as, heating coils in floors, traffic routes (for example, bridges, ramps, etc.) or heating radiators and the like, but also heat exchangers and particularly heat pumps. As a rule, the energy exchanger will be constructed for the dissipation of energy, i.e. for heating purposes. However, the energy exchanger may also be used for absorbing heat, so that the installation can be used for cooling.

I claim:

1. Installation for energy exchange between the ground and an energy exchanger (4) which is connected through an insulating flow line (26) with a pump (28) arranged in a borehole (32), wherein the flow line (26) and the pump (28) in the borehole (32) are surrounded by a protective tube (34) which is open at the bottom, a return region (38) for return water being located adjacent the protective tube (34) and extending radially outwardly to the borehole wall, the return region (38) containing a porous filling (48) and being connected at the bottom (30) of the borehole (32) to the pump (28) and leading into a return line (42) of the energy exchanger (4), characterized in that the return line (42) in the borehole (32) has at least one return pipe (40) which reaches at least approximately to the bottom (30) of the borehole (32), the return pipe (40) having several transverse plugs (44) which are distributed over the length of the return pipe (40) and passages (46) arranged on both sides of the transverse plugs (44), the return pipe (40) being embedded in the porous filling (48) in the return region (38).

2. Installation according to claim 1, characterized in that the passages (46) are longitudinal slots which preferably have a width of 1 mm and a length of 150 mm.

3. Installation according to claims 1 or 2, characterized in that the return pipe (40) has several rows $50_{1\ to\ 4}$ of circumferentially distributed passages (46), wherein the rows are distributed over the length of the return pipe (40) and the passages of adjacent rows are preferably arranged offset relative to each other in circumferential direction.

4. Installation according to claims 1 or 2, characterized in that the porous filling (48) is gravel preferably having a granular size of 0.8 to 8 mm.

5. Installation according to claims 1 or 2, characterized in that several return pipes (40) distributed around the protective tube (34) are arranged in the return region (38) of the borehole (32).

6. Installation according to one of claims 1 or 2, characterized in that the flow line (26) and/or the protective tube (34) and/or the return pipe (40) are of plastic material, preferably of polyvinylchloride.

7. Installation according to claims 1 or 2, characterized in that a scavenging pump (54) is connectible to the protective tube (34) for conducting return flushing water through the protective tube (34) into the return region (38).

* * * * *